United States Patent [19]

Le Bihan et al.

[11] Patent Number: 5,082,305

[45] Date of Patent: Jan. 21, 1992

[54] URBAN MOTOR VEHICLE FOR TOWING A DELIVERY TRAILER

[75] Inventors: Louis Le Bihan; Antoine Fritsch, both of Paris, France

[73] Assignee: Louis Le Bihan, Paris, France

[21] Appl. No.: 460,341

[22] PCT Filed: Sep. 25, 1989

[86] PCT No.: PCT/FR89/00487

§ 371 Date: May 18, 1990

§ 102(e) Date: May 18, 1990

[87] PCT Pub. No.: WO90/03299

PCT Pub. Date: Apr. 5, 1990

[30] Foreign Application Priority Data

Sep. 23, 1988 [FR] France .................. 88 12428

[51] Int. Cl.$^5$ ........................... B60D 1/00
[52] U.S. Cl. ........................ 280/504; 280/496
[58] Field of Search ............. 280/22, 764.1, 765, 280/504, 511, 204, 493, 496; 180/22, 140

[56] References Cited

U.S. PATENT DOCUMENTS

| | | | |
|---|---|---|---|
| 2,635,891 | 4/1953 | Cook | 280/511 |
| 3,734,536 | 5/1973 | Dever et al. | 280/204 |
| 4,077,645 | 3/1978 | Dortch et al. | 280/511 |
| 4,511,155 | 4/1985 | Galloway | 280/204 |
| 4,610,457 | 9/1986 | Harmon | 280/204 |

FOREIGN PATENT DOCUMENTS

| | | |
|---|---|---|
| 662887 | 8/1965 | Belgium . |
| 1506602 | 12/1967 | France . |
| 2398655 | 2/1979 | France . |
| 426510 | 6/1967 | Switzerland . |

Primary Examiner—Richard A. Bertsch
Assistant Examiner—Tamara L. Finlay
Attorney, Agent, or Firm—McAulay Fisher Nissen Goldberg & Kiel

[57] ABSTRACT

An urban delivery motor vehicle, provided with a front towing unit having a vertical front-rear symmetry tiable to a towed unit, and comprising a central part forming a driver-passenger cockpit substantially symmetrical about a substantially vertical axis and having a rear part provided with a space located below the cockpit and opened on its sides and on its rear part; two front wheels and at least one rear wheel located within the space and coplanar with the vertical front-rear symmetry of the towing unit, and an attachment located close to the vertical axis for receiving a complementary attachment of the towed unit to link it thereto.

15 Claims, 3 Drawing Sheets

URBAN MOTOR VEHICLE FOR TOWING A DELIVERY TRAILER

The present invention relates to a motor vehicle comprising a delivery trailer.

The invention thus relates to the very general problem of delivery by motor vehicle, particularly in towns, of objects of various volume and weight (packets, parcels, mail) sent to diverse purchasers or consumers.

The problem of delivery in towns is to a great extent linked with this diversity of shape and weight of the objects to be delivered, as well, of course, as with the traffic, parking and loading of the delivery vehicles.

Various solutions have been proposed for the delivery vehicles which are generally compromises between two contractictory necessities, namely that linked with the transport of voluminous objects which requires a cumbersome vehicle and that linked with the facility of circulation, particularly in a town, which requires vehicles which are all the easier to handle as their dimensions are more reduced.

The present invention has for its object a novel type of motor vehicle ensuring transport of voluminous parcels and which is at the same time particularly easy to handle and easy to load.

The present invention thus has for its object a motor vehicle comprising a front towing unit provided with a driver space, of which at least the rear part is substantially of revolution and tiable to a towed unit, characterized in that the lower rear part of this driver space comprises a space communicating freely with the outside, in which are housed, on the one hand, at least one rear wheel, coplanar with the vertical front/rear symmetry plane of the vehicle and, on the other hand, an articulated coupling member on the towed unit, located close to the substantially vertical axis of the driver space.

Such an arrangement thus makes it possible to have available a vehicle comprising a trailer of minimum length, since the point of coupling is displaced as near as possible to, and below, the driver space of the towing unit of the vehicle and the front part of the trailer, or towed unit, may be located near the rear part of the driver space.

On the other hand, the location of the point of coupling, the shape of the driver space and the median position of the rear wheel or wheels make it possible to orient the towing unit of the vehicle with respect to its trailer with a small angle, this giving the vehicle a minimum radius of lock.

Moreover, in a preferred embodiment, where the drawbar of the trailer is fixed beneath the towing unit of the vehicle, production of trailers whose loading platform is located at a low level with respect to the ground, which facilitates the loading operation, is rendered easier.

The present invention also makes it possible to apply the force transmitted by the drawbar of the trailer near the axis of the driver space, which improves the stability of the vehicle and adherence thereof.

Finally, by reason on the one hand of the shape substantially of revolution of the rear part of the driver space, and of the coplanar position of the rear wheel or wheels with the vertical front/rear symmetry plane of the vehicle, it is possible, by providing a notch in the lower rear part of the doors, to slide the latter rearwardly in order to pass them from a position of closure to a position of opening. Such an arrangement makes it possible considerably to increase the facility of use of the vehicle, all the more so as the present arrangement may be employed on doors of vehicles of which the lower part descends sufficiently low to promote maximum access thereof.

In a particularly interesting variant of the present invention, the notch provided in the lower rear part of the doors is such that it merges with the lower rear wall of the driver space, adjacent the space communicating freely with the outside.

Two embodiments of the present invention will be described hereinafter by way of non-limiting examples, with reference to the accompanying drawings, in which.

Figure 1:
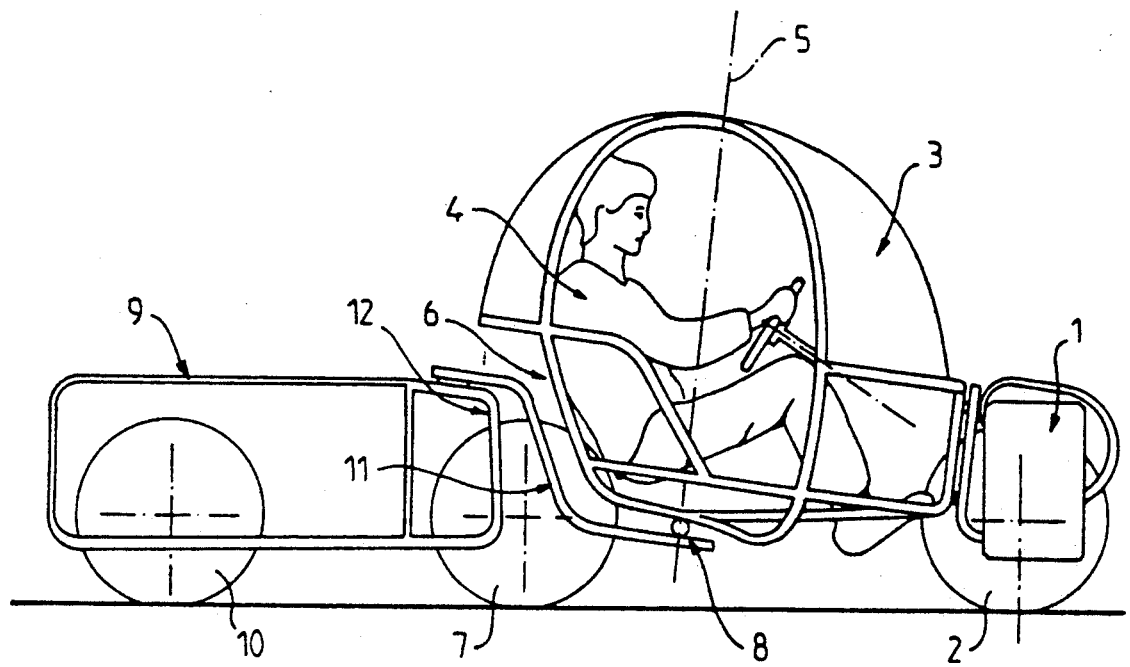
FIGS. 1 and 2 are views respectively in elevation and in plan of an embodiment of the invention, shown schematically.
Figure 2:
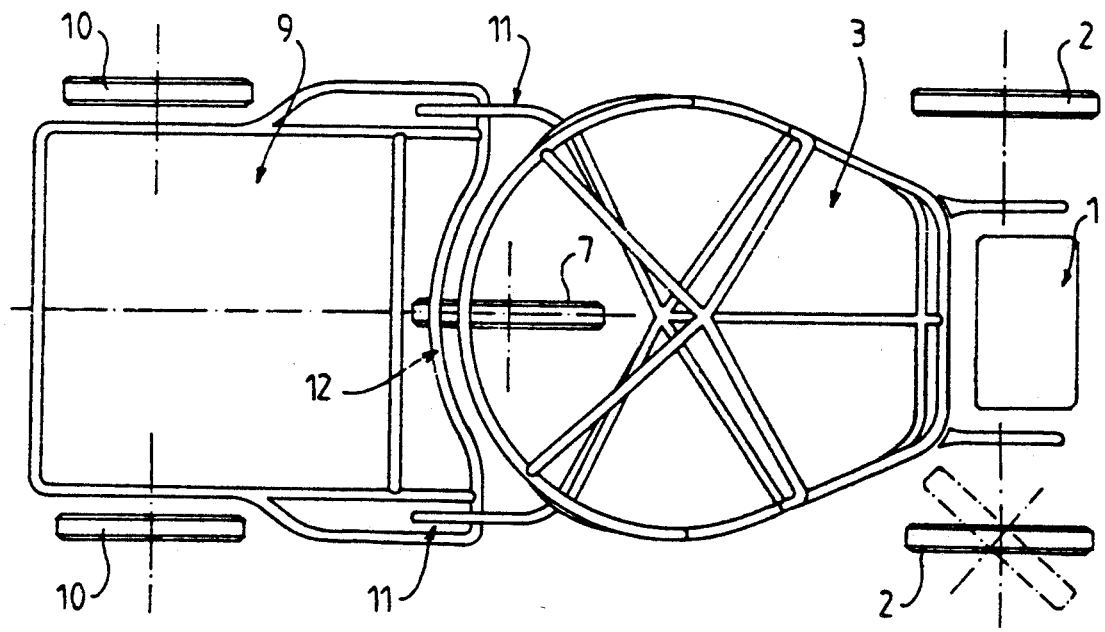

In FIGS. 1 and 2, the towing unit of the vehicle according to the invention is essentially constituted by its central part forming a driver space 3 and comprises a drive unit 1 and two front drive wheels 2. The driver space 3 is of shape substantially of revolution, here substantially spherical, about a substantially vertical axis 5 and is pierced with a passage 4 giving access to the interior of the driver space 3.

The lower rear part of the driver space 3 leaves a space 6 freely communicating with the outside. In this space is housed, on the one hand, a rear wheel 7, coplanar with the vertical front/rear symmetry plane of the vehicle, and, on the other hand, an articulated coupling member 8 of a towed unit, or trailer 9, located on axis 5 and disposed beneath the driver space 3.

In this embodiment, the trailer 9 has two rear wheels 10 and is as low-slung as possible, thanks to a coupling drawbar 11.

The coupling drawbar is constituted by two arms 11a fixed on each of the lateral faces of the trailer 9, which converge on each side of the wheel 7 towards the central articulated coupling member 8.

The front part 12 of the trailer 9 is of circular shape, with its concavity oriented towards the interior of the trailer, with the result that the towing unit of the vehicle and the trailer 9 may be articulated angularly with a minimum radius of lock. The median position of the rear wheel 7 of the towing unit of the vehicle makes it possible to obtain angles, between the longitudinal axis of the trailer and the longitudinal axis of the towing unit of the vehicle, of relatively reduced value.

Figure 3:
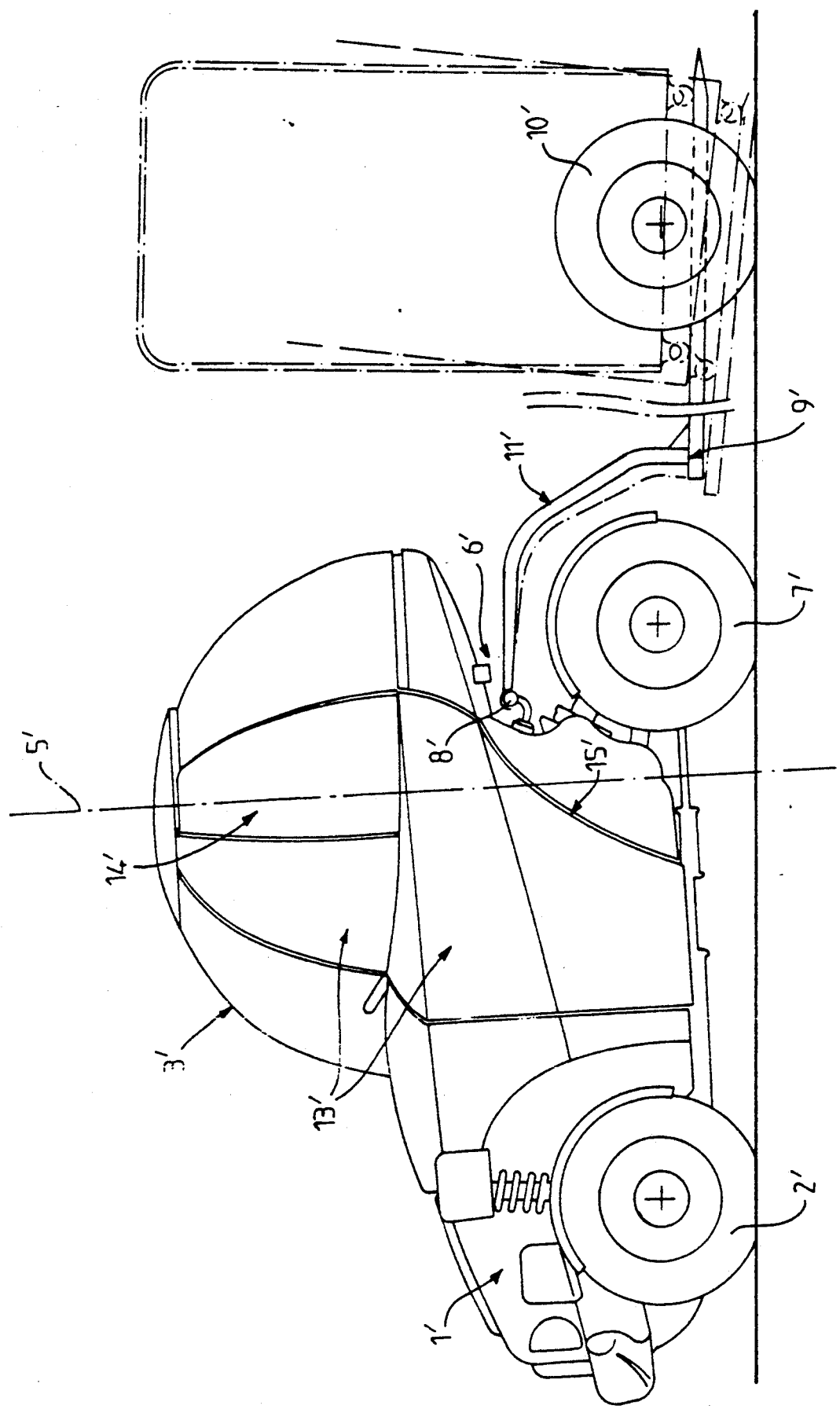
FIGS. 3 and 4 are views respectively in elevation and in plan of a variant embodiment of the invention, shown schematically.
Figure 4:
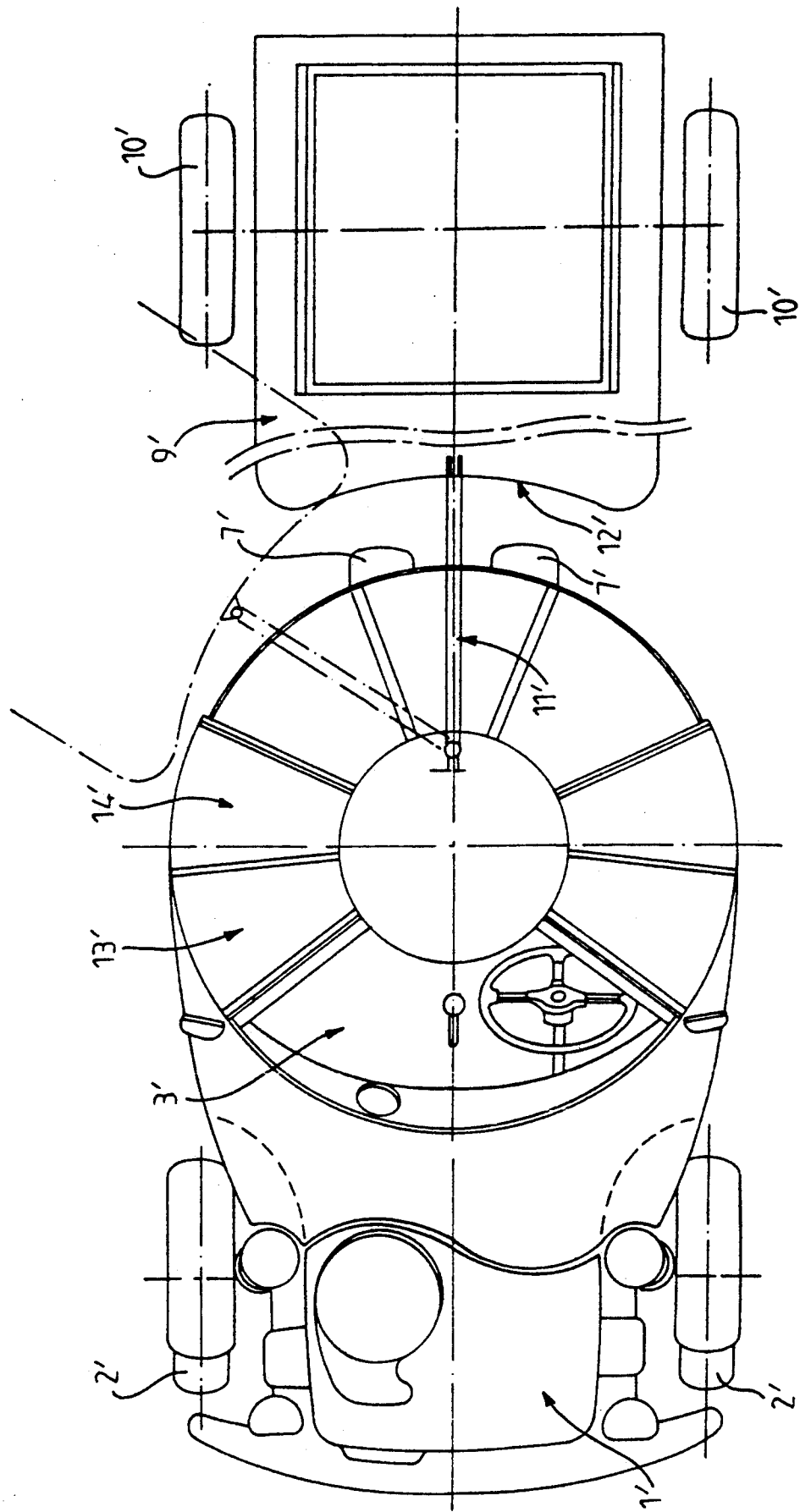

FIGS. 3 and 4 schematically represent a variant of an embodiment of the invention. In these Figures, the same reference numerals as those used in FIGS. 1 and 2 are conserved for like elements, with index ' added thereto. In these Figures, it will be noted that, for technical reasons, the articulated coupling member 8 is located, no longer exactly on axis 5', but close to it. Consequently, there is no longer exact concentricity of the circular movements of the driver space and the trailer, but only virtual concentricity, which nonetheless makes it possible to obtain a minimum angle between the longitudinal axis of the towing unit of the vehicle and that of the trailer, sufficient in practice to give the assembly a very small radius of lock.

Although a front face of the trailer has been shown of circular shape, of the same radius as the spherical part of the driver space, a plane front face may in practice be had without losing the above advantages.

In this example, two rear wheels 7 have been provided, for reasons of transmission of load to the ground, but these wheels are nonetheless close to the median vertical front/rear symmetry plane of the vehicle.

Finally, it is seen that doors 13' and windows 14' also have the same spherical shape as that of the rest of the driver space, so as to pivot about axis 5' of the driver space in order to allow opening and closure thereof without modifying the hold of the vehicle on the ground. The median position of the rear wheels 7' and the notched lower part 15' of the doors allow free rotation of the latter towards the rear of the vehicle, during opening thereof.

It will be observed that the towing unit of the vehicle may possibly be used alone without being coupled to a trailer.

We claim:

1. An urban delivery motor vehicle, including:
   a front towing unit tiable to a towed unit, said towing unit having a vertical front-rear symmetry and comprising:
   a) a central part forming a driver passenger cockpit substantially symmetrical about a substantially vertical axis, said cockpit having a rear part provided with space means, including a space located below said cockpit and opened on its sides and on the rear part of said cockpit;
   b) two front wheels and at least one rear wheel, said rear wheel being coplanar with the vertical front-rear symmetry of said towing unit, said at least one rear wheel being located within said space; and
   c) an attachment device located close to said vertical axis, concepted to receive a complementary attachment device of said towed unit to link it to said towing unit.

2. The urban delivery motor vehicle according to claim 1, wherein said attachment device is located below said cockpit.

3. The urban delivery motor vehicle according to claim 1, wherein said attachment device is located above said at least one rear wheel.

4. An urban delivery system, having an autonomous front towing unit, including:
   a central part forming a driver-passenger cockpit;
   a forwardly located drive unit and two front drive wheels;
   said driver cockpit having a shape substantially spherical, about a substantially vertical axis located at the center of gravity of the towing unit;
   the rear portion of said driver cockpit being specifically concepted so as to provide an exterior housing having an accessible space;
   said exterior housing space including a housing for a rear wheel assembly of said towing unit, said rear wheel assembly being centrally located and coplanar with the vertical front and rear symmetry of the vehicle, and an articulated attachment point located close to said substantially vertical axis of said cockpit; and
   an autonomous wheeled rear towed unit having a drawbar for attachment to said articulated attachment point of the towing unit;
   said towed unit incorporating a storage and transportation compartment of said system;
   said urban delivery system, by virtue of the location of said attachment point forwardly and substantially at said vertical axis of the towing unit, thereby permitting construction of said towing unit with a uniquely minimum length; and
   said forward location of said attachment point and said exterior space, allowing uninhibited lateral movement of said drawbar at the rear of said driver cockpit, whereby said system may be operated within a uniquely small turning radius.

5. The urban delivery system as set forth in claim 4, wherein said attachment point is located below said driver cockpit.

6. The urban delivery system as set forth in claim 5, including an access trap located in said cockpit in the rear thereof at the side of the driver above said attachment point to facilitate accessibility of said attachment point for detachment of said towed vehicle by the driver.

7. The urban delivery system as set forth in claim 6, wherein said towed unit includes means operable from the driver area which lowers so as to contact the ground for support of said drawbar of the towed unit permitting the towed unit to be maintained in its upright, horizontal or towed position prior to the driver effecting the detachment of said towed unit.

8. The urban delivery system as set forth in claim 4, wherein said attachment point is located above said rear wheel assembly within said exterior housing space to the rear of said cockpit and physically close to the seated driver.

9. The urban delivery system as set forth in claim 8, including an access trap located in said cockpit in the rear thereof at the side of the driver above said attachment point to facilitate accessibility of said attachment point for detachment of said towed vehicle by the driver.

10. The urban delivery system as set forth in claim 9, wherein said towed unit includes means operable from the driver area which lowers so as to contact the ground for support of said drawbar of the towed unit permitting the towed unit to be maintained in its upright, horizontal or towed position prior to the driver effecting the detachment of said towed unit. thereof at the side of the driver above said attachment point to facilitate accessibility of said attachment point for detachment of said towed vehicle by the driver.

11. The urban delivery system as set forth in claim 4, including an access trap located in said cockpit in the rear.

12. The urban delivery system as set forth in claim 11, wherein said towed unit includes means operable from the driver area which lowers so as to contact the ground for support of said drawbar of the towed unit permitting the towed unit to be maintained in its upright, horizontal or towed position prior to the driver effecting the detachment of said towed unit.

13. A motor vehicle, comprising:
   a front towing unit provided with a driver area (3, 3'), at least a rear part of said driver area being spherically-shaped and tiable to a towed unit (9, 9');
   a lower rear part of said driver area comprising a portion having means providing access thereto from the outside, at least one rear wheel (7, 7') coplanar with the vertical front/rear symmetry plane of the vehicle housed within said portion; and
   an articulated coupling member (8, 8') on said towed unit (9, 9') located close to a substantially vertical axis (5, 5') of the driver area (3, 3') also housed within said portion;

said towing unit comprising at least one door (13, 13') mounted to slide between a position of closure and a position of opening located to the rear of the position of closure; and the lower rear part of the door (13, 13') being provided with a notch over a height extending from the base of the driver area (3, 3') up to at lest the height of the articulated coupling member (8, 8'), said latch being located in line with a rear face of the driver area adjacent to the portion (6, 6') provided to the rear of the towing unit of the vehicle and communicating with the outside when said door (13, 13') is closed.

14. The motor vehicle according to claim 13, wherein said articulated coupling member (8, 8') is disposed between said substantially vertical axis (5, 5') and a vertical line passing through the axis of rotation of the rear wheel (7, 7').

15. The motor vehicle according to claim 13, wherein a lower part of said door (13, 13') is located at a level at least as low as that of a straight line joining the axis of the hubs of the front (2, 2') and rear (7, 7') wheels of said towing unit.

* * * * *